United States Patent [19]
Strolle et al.

[11] Patent Number: 5,623,573
[45] Date of Patent: Apr. 22, 1997

[54] BACKWARD COMPATIBLE HDTV RECORDING/REPRODUCING SYSTEM

[75] Inventors: Christopher H. Strolle, Glenside, Pa.; Jung W. Ko, Lawrenceville, N.J.

[73] Assignee: SamSung Electronics Co., Ltd., Suwon, Rep. of Korea

[21] Appl. No.: 157,340

[22] Filed: Nov. 24, 1993

Related U.S. Application Data

[63] Continuation-in-part of Ser. No. 899,305, Jun. 16, 1992, abandoned.

[51] Int. Cl.⁶ .............................. H04N 5/78; H04N 5/782
[52] U.S. Cl. ................................................ 386/92; 386/74
[58] Field of Search ..................................... 358/335, 328, 358/341, 343; 360/19.1, 21, 22, 33.1; 386/46, 23, 39, 74, 75, 92; H04N 5/78, 5/782

[56] References Cited

U.S. PATENT DOCUMENTS

| | | | |
|---|---|---|---|
| 3,925,816 | 12/1975 | Kihara | 358/328 |
| 4,296,430 | 10/1981 | Warren | 358/328 |
| 4,591,924 | 5/1986 | Miura et al. | 358/328 |
| 4,607,293 | 8/1986 | Okada et al. | 360/21 |
| 4,608,611 | 8/1986 | Ota | 358/328 |
| 4,660,072 | 4/1987 | Fukinuki | 358/12 |
| 4,660,104 | 4/1987 | Higurashi | 358/343 |
| 4,679,097 | 7/1987 | Tomuta | 358/328 |
| 4,720,751 | 1/1988 | Peters | 358/310 |
| 4,742,386 | 5/1988 | Wilkinson | 358/13 |
| 4,745,460 | 5/1988 | Fukinuki | 358/12 |
| 4,811,116 | 3/1989 | Baumeister | 358/310 |
| 4,831,463 | 5/1989 | Faroudja | 358/310 |
| 4,843,485 | 6/1989 | Reitmeier | 360/9.1 |
| 4,870,481 | 9/1989 | Kawamata | 358/31 |
| 4,885,631 | 12/1989 | Fukinuki et al. | 358/21 R |
| 4,901,159 | 2/1990 | Hitotsumachi | 358/341 |
| 4,928,186 | 5/1990 | Matsumoto | 360/21 |
| 4,941,055 | 7/1990 | Fujimoto | 358/340 |
| 4,943,848 | 7/1990 | Fukinuki | 358/12 |
| 4,949,173 | 8/1990 | Mitsuhashi | 360/33.1 |
| 4,963,991 | 10/1990 | Honjo | 358/310 |
| 4,984,093 | 1/1991 | Schmidtmann et al. | 358/330 |
| 5,031,030 | 7/1991 | Hurst, Jr. | 358/12 |
| 5,050,010 | 9/1991 | Park | 360/33.1 |
| 5,060,077 | 10/1991 | Koya et al. | 358/335 |
| 5,063,457 | 11/1991 | Ishikawa et al. | 358/330 |
| 5,113,262 | 5/1992 | Strolle, et al. | 358/310 |
| 5,182,642 | 1/1993 | Gersdorff et al. | 358/133 |
| 5,257,107 | 10/1993 | Hwang et al. | 358/310 |

OTHER PUBLICATIONS

Journal of British I.R.E. on "Reduction of Television Bandwidth by Frequency–Interlace", Feb. 1960, pp. 127–136 (disclosed by Howson and Bell).

*Primary Examiner*—Thai Q. Tran
*Assistant Examiner*—Huy Nguyen
*Attorney, Agent, or Firm*—Robert E. Bushnell, Esq.

[57] ABSTRACT

A magnetic tape recording with a new signal-encoding format, apparatus for recording this format and reproducing apparatus for reproducing signals from this format. A standard VHS signal is recorded as a first set of parallel slant tracks having a predetermined space between each slant track. A high definition television signal is recorded in pairs of slant tracks of a second type that flank a slant track of first type and are narrower in width than the slant track of first type they flank. Additionally, the azimuth angle of the tracks of first type alternates between different predetermined values for successive tracks, and the azimuth angle of the tracks of second type differ both from the azimuth angle of the track of the first type they flank and from the azimuth angle of the tracks of second type which are positioned next to them in the space between the tracks of first type. This format allows one tape to record both a high-definition television signal and a standard VHS signal, which standard VHS signal can be played back using ordinary VHS tape machines. Accordingly, this format provides a way to avoid the problem of having to carry a dual inventory of tapes in a tape sales or rental business.

29 Claims, 4 Drawing Sheets

BACKWARD COMPATIBLE HDTV RECORDING/REPRODUCING SYSTEM

This is a continuation of application Ser. No. 07/899,305, filed 16 June 1992, abandoned.

BACKGROUND OF THE INVENTION

1. Field of the Invention

The present invention relates to a magnetic tape recording/reproducing format and apparatus in accordance therewith, and more particularly, to an HDTV recording/reproducing magnetic tape format and apparatus which has backward compatibility to another format, such as the standard VHS television signal recording format.

2. Description of the Prior Art

U.S. Pat. No. 4,963,991 issued to Honjo on Oct. 16, 1990 discloses a tape recording format and recorder apparatus which allows recording/reproduction of television signals in both a narrow bandwidth format, such as a conventional NTSC signal having a bandwidth of approximately 4 mHz, and a wide bandwidth format, such as a high definition television signal (HDTV) having a bandwidth of 8–20 mHz. This is accomplished by recording only one of the narrow bandwidth or wide bandwidth signals on the tape at a time. When wide bandwidth signals are recorded, instead of increasing the speed of the recording tape, two smaller heads are used for digitally recording time-expanded channels of the wide bandwidth signal, and the speed of the rotating drum in which the recording heads are mounted is correspondingly increased. Thus, tape speed is the same for both formats. However, since only one format at a time is recorded on the tape, video tape players not equipped to play the television signal which was selected for recording on the tape will not be able to use these tapes.

U.S. Pat. No. 4,941,055 issued on Jul. 10, 1990 to Fujimoto discloses a format for magnetic recording on a video floppy disk a wide band video signal which is divided into two signals; one, a low frequency component in the frequency range below 4 mHz, and the other in the high frequency range, 4–6 mHz. The low frequency component is recorded in a plurality of main slant tracks having spaces therebetween, and the high frequency component is recorded in the guard band between the main tracks and at an azimuth angle which is different from the main track in order to minimize pick-up of the adjacent track during head mistracking. (The azimuth angles of heads on headwheels used for helically scanning of magnetic tape are customarily measured with repect to a line perpendicular to the plane of headwheel rotation, and the azimuth angles of recorded tracks refer back to the heads used in recording them in a magnetic tape surface; these customs are followed in this specification and its accompanying drawing.) Although two track recording is disclosed, only one television signal format is recorded/reproduced. Thus, there is no simultaneous compatibility with another television signal recording format, which would increase the desirability and user demand for such tapes when pre-recorded with multiple television signal formats. Furthermore, since the total frequency content of a single signal is split among two channels and two recording/pick-up heads, it is the belief of the present inventors that time-base errors will necessarily exist between the reproduced signals which will be impossible to correct with even the best time base correctors, thereby resulting in unacceptable HDTV performance.

U.S. Pat. No. 4,843,485 issued to Reitmeier on Jun. 27, 1989 discloses a recording format and recording/reproducing apparatus in accordance therewith which simultaneously provides for recording/reproducing one of either a wide bandwidth (studio quality) signal or a narrow bandwidth (portable quality) television signal on a magnetic tape. Here, the tape is longitudinally divided into upper and lower halves. Each half receives digital recording of one half of the signal components of the wide bandwidth signal, so that pick-up of only one longitudinal track results in reproduction of a low quality signal, while pick-up of both tracks simultaneously results in a high quality signal.

U.S. Pat. No. 4,928,186 issued to Matsamoto et al. on May 22, 1990 discloses a tape recording format and recording/reproducing apparatus in accordance therewith which records a video signal on the main tracks of a video floppy disk, and also records additional information (audio) in the guard band space which exists between the main tracks. An additional aspect of this patent is that the guard band signal should be recorded with an electromotive force which is only 40–80% of the electromotive force used in the main tracks, in order to minimize deterioration of the main tracks during recording of the guard band tracks.

It is an object of the present invention to provide a magnetic media recording format which allows recording of two different signals in two different formats on one media, and selective reproduction of signals from either one of the two recorded formats.

It is a further object of the invention to provide a recording format in which it is relatively simple to record and then reproduce signals therefrom.

These and other objects of the invention will become apparent from the following detailed description of a preferred embodiment of the invention, the accompanying drawings and the claims.

SUMMARY OF THE INVENTION

A magnetic recording media having a recording format thereon of the type comprising, a plurality of a first type of parallel slant tracks recorded on the magnetic media, the first type of tracks having a predetermined spacing therebetween, a given track width, and a given azimuth angle, and a plurality of a second type of slant tracks which are parallel to the first type and recorded on the magnetic media, the width of the second type of tracks being substantially one-half the predetermined spacing between successive tracks of the first type so that two tracks of the second type are positioned between each track of the first type.

Furthermore, apparatus for recording signals on a recording medium in accordance with the invention, comprises first means for recording a first information signal on the medium as a plurality of a first type of parallel slant tracks having a predetermined spacing therebetween, a given bandwidth and a given azimuth angle, and second means for recording a second information signal on the medium as a plurality of a second type of slant tracks which are parallel to the first type, the second type of tracks having a width substantially equal to one-half the spacing between successive ones of the first type of tracks so that two tracks of the second type are recorded between each track of the first type.

In accordance with one aspect of the invention, the azimuth angle of the second type of tracks is opposite from the azimuth angle from the first type of tracks and furthermore has an azimuth angle at least twice as great as the azimuth angle of the first type of tracks.

In accordance with a further aspect of the invention, the first information signal comprises a standard analog VHS signal and the second information signal comprises a digitized and randomized HDTV signal.

In accordance with a still further aspect of the invention, the second type of tracks are intitially formed using a relatively wide head and the first type of tracks are formed by the centering of a relatively narrower head within the track generated by the relatively wide head, so as to form a track of the first type which has tracks of the second type on either side thereof.

DETAILED DESCRIPTION OF THE PREFERRED EMBODIMENTS OF THE INVENTION

Figure 1:
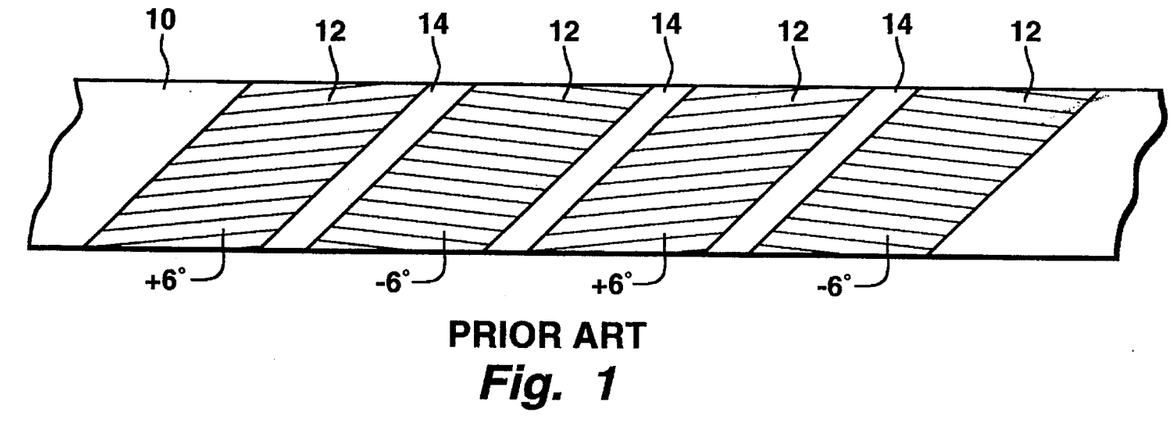
FIG. 1 illustrates a conventional track format on a video tape formed by a two-head VHS VTR.

FIG. 1 illustrates a conventional track format on a video tape 10 for a two-head VHS VTR when recording in the two-hour mode. The two-head VTR has heads that are 34 micrometers wide, which trace parallel slant tracks 12 and leave an unused space or guard band 14 which is 24 micrometers wide therebetween. As well known to those skilled in VTR technology, the recording/reproducing heads are aligned at a predetermined azimuth angle in order to prevent pick-up of signal from an adjacent track in the event that during reproduction the pick-up head scans the adjacent track (mistracking). As indicated in FIG. 1, two recording heads are used which have opposite azimuth angles of +6° and −6°, respectively. It is noted that four-head machines typically have two wide recording heads of 58 micrometers wide each, which are used for the two-hour recording mode. In this case there would be no guard band between the parallel slant tracks. As well known, the 58 micrometer wide tracks are fully compatible with reproduction by a VTR having 34 micrometer wide heads. The four-head VTR also has 34 micrometer wide heads for use in the four- and six-hour recording modes.

The present invention takes advantage of the fact that in the two-hour VHS recording formats, only 34 micrometer wide tracks are needed for compatibility with the VHS system and that therefore auxiliary information can be recorded in the unused guard band portions of the tape while the main tracks of the tape record standard VHS signals. Thus, a tape is provided which allows the recording/reproduction of auxiliary signals, an is also backward compatible with the standard VHS system. In the preferred embodiment of the invention, the auxiliary information is not a fractional bandwidth component of the standard VHS signal in order to augment or improve its resolution, but is a separate signal such as a digital HDTV signal, a wide screen TV signal, or other TV signal having better definition than that offered by standard VHS, and the standard VHS signal is recorded in the main tracks.

Figure 2:
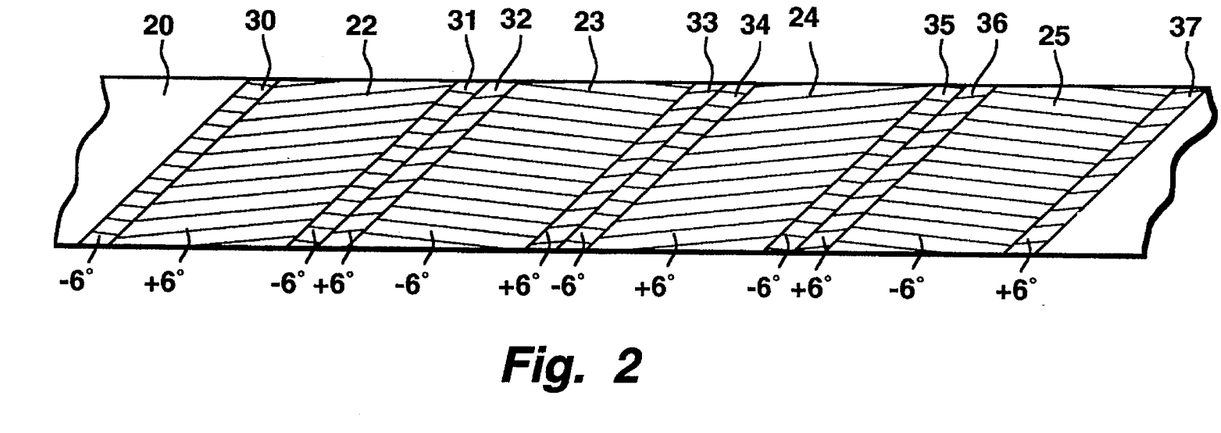
FIG. 2 illustrates a track format in accordance with the invention having standard VHS tracks which are flanked on opposite sides by additional tracks for recording/reproducing an additional information signal in accordance with the invention.

FIG. 2 illustrates the new track format recorded on a video tape 20 having standard VHS tracks 22–25 which are each 34 micrometers wide and have a successively alternating azimuth angle of +6° and −6° therebetween. Thus, these tracks are compatible with recording/reproduction of standard VHS signals by VTR's having either 34 micrometer wide or 58 micrometer wide heads. Additionally, tape 20 has pairs of auxiliary information tracks 30–37 which flank the opposite sides of each standard VHS track. Thus, there are two auxiliary tracks associated with each standard VHS track, which are available for recording/reproducing an additional signal, preferably an HDTV signal. These tracks are "hidden" from pick-up during head mistracking in the standard VHS mode by using an azimuth angle for the auxiliary tracks which straddle each standard track which is opposite from that used by the straddled VHS standard track. This combination of three tracks, a VHS track of a given azimuth angle, flanked on opposite sides by two narrower tracks of equal azimuth angle but different from the azimuth angle of their intermediate VHS track, is called a composite track. As shown in FIG. 2, auxiliary information tracks 30 & 31 are a pair of duplicately recorded tracks. Similarly, auxiliary information tracks 32 & 33, tracks 34 & 35, and tracks 36 & 37 are each a pair of duplicately recorded tracks.

With this format, three essential objectives are met. First, the azimuth angle of successive VHS tracks is maintained for compatibility with standard VHS. Second, when the VTR is acting as a VHS player, it does not see that auxiliary tracks because they are of a different (preferably opposite) azimuth angle. Third, alternation of azimuth angles between all successive tracks, both VHS and auxiliary, is achieved. These second and third objectives ensure that the auxiliary tracks will have the same azimuth rejection capability during playback which is so important to narrow track recording. Azimuth rejection is less effective at lower recording frequencies, so the information signal of the auxiliary tracks is pre-adjusted so as to be free of low frequencies. This is standard practice in digital recording systems using azimuth heads. During playback of the signal from the auxiliary tracks, the low frequency portion is not used. By increasing the azimuth angle beyond 6° for the auxiliary tracks, it would be possible to achieve greater rejection at lower frequencies. This would allow a lower frequency band edge for the auxiliary tracks to be utilized, further increasing the available bandwidth in the auxiliary tracks. The same azimuth rejection for VHS playback and auxiliary track playback would be maintained. An additional advantage to increasing the azimuth angle of the auxiliary tracks is to improve the backward compatibility aspect of the format. That is, during playback, the +6° head, reading the +6° VHS track, if severely mistracking, could pick-up signals from the nearest +6 auxiliary track (which is two tracks away) causing a moire pattern in the VHS signal. This is also true for the −6° VHS head. Increasing the azimuth angles of the auxiliary tracks to, for example, +18° and −18°, respectively, would substantially solve this problem.

Figure 6:
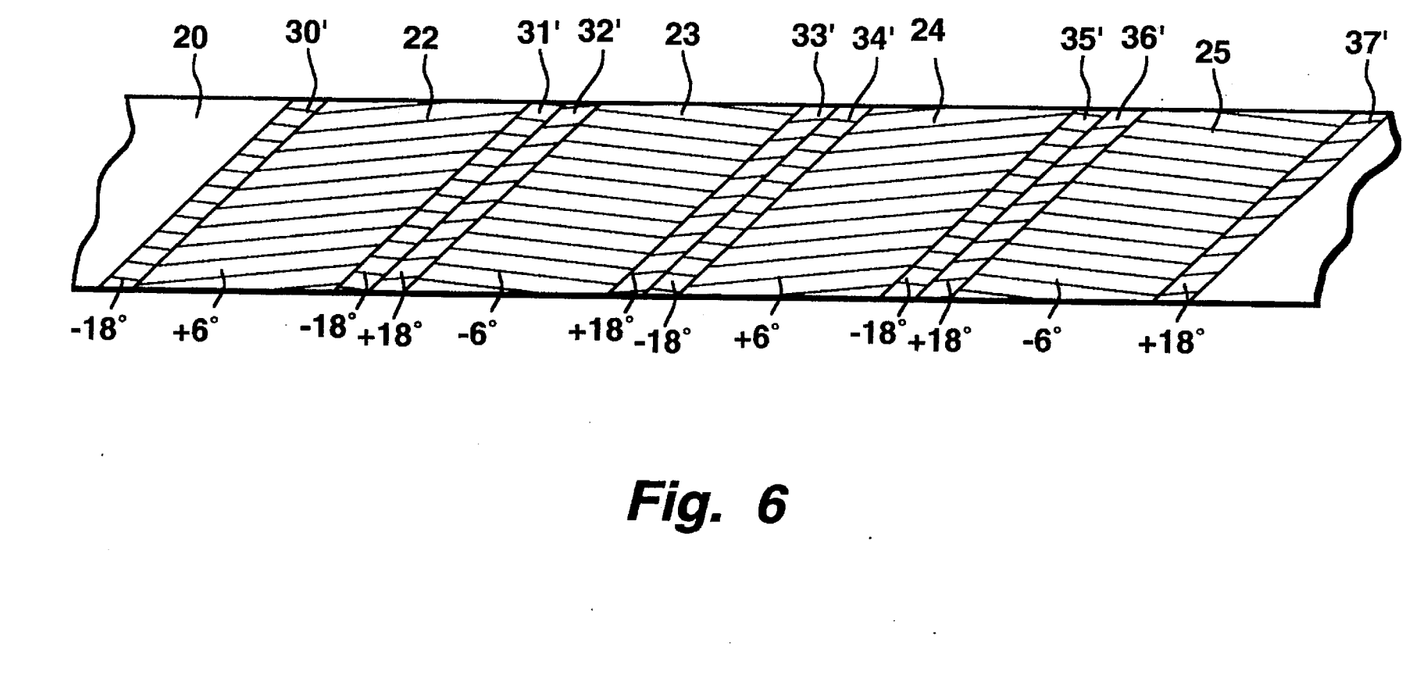
FIG. 6 illustrates an alternative track format in accordance with the invention having standard VHS tracks which are flanked by additional tracks for recording/reproducing an additional information signal in accordance with the invention.

FIG. 6 illustrates this alternative. In FIG. 6 the FIG. 2 tracks 30, 31, 34 and 35 having −6° azimuth angles are replaced by tracks 30', 31', 34' and 35' having −18° azimuth angles; and the FIG. 2 tracks 32, 33, 36 and 37 having +6° azimuth angles are replaced by tracks 32', 33', 36' and 37' having +18° azimuth angles.

As shown in FIG. 6, auxiliary information tracks 30' & 31' are a pair of duplicately recorded tracks. Similarly, auxiliary information tracks 32' & 33', tracks 34' & 35', and tracks 36' & 37' are each a pair of duplicately recorded tracks.

Figure 3:
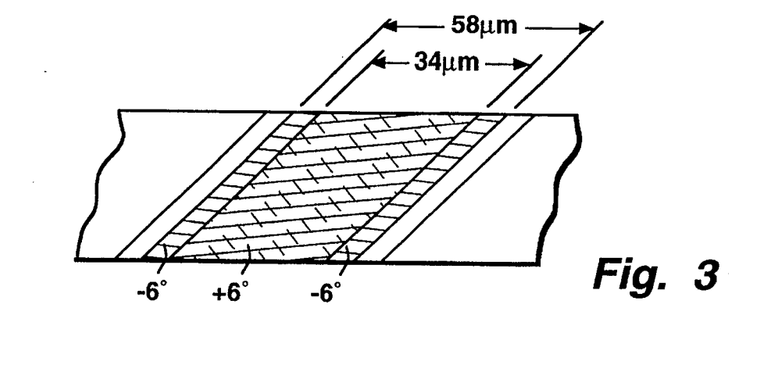
FIG. 3 illustrates one method useful for creating the track format shown in FIG. 2.

Although one would think that the track format of FIG. 2 would require at least one pair of heads for recording the auxiliary tracks, in accordance with a further aspect of the invention shown in FIG. 3, the auxiliary tracks are created by first recording a relatively wide track (i.e., 58 micrometers) using the auxiliary information, and then recording a 34 micrometer standard VHS track of opposite azimuth angle in the middle of the wide auxiliary track, thereby forming the composite three-track format.

In accordance with a further feature of the invention, the azimuth angle of the wide track can differ by a factor of two or even three from that of the narrow tracks, in order to further reduce cross-pickup during head mistracking.

In accordance with an even further feature of the invention, to further minimize "cross-talk" interference between the standard VHS and the auxiliary signal due to mistracking, it is preferable that the auxiliary signal be a digital signal without low frequency components that could interfere with the analog VHS signal.

In accordance with a still further feature of the invention, a further improvement in reducing the signal degradation due to mistracking can be had if the digital signal is randomized with respect to time, a technique well known to those skilled the digital signal processing technology. When the information content of the auxiliary signal is randomized, a severe mistracking, which would normally result in a loss of some information in the auxiliary signal, will not repetitively degrade the signal of information content at the same point in the image which would otherwise lead to visible bands of interference.

Figure 4:
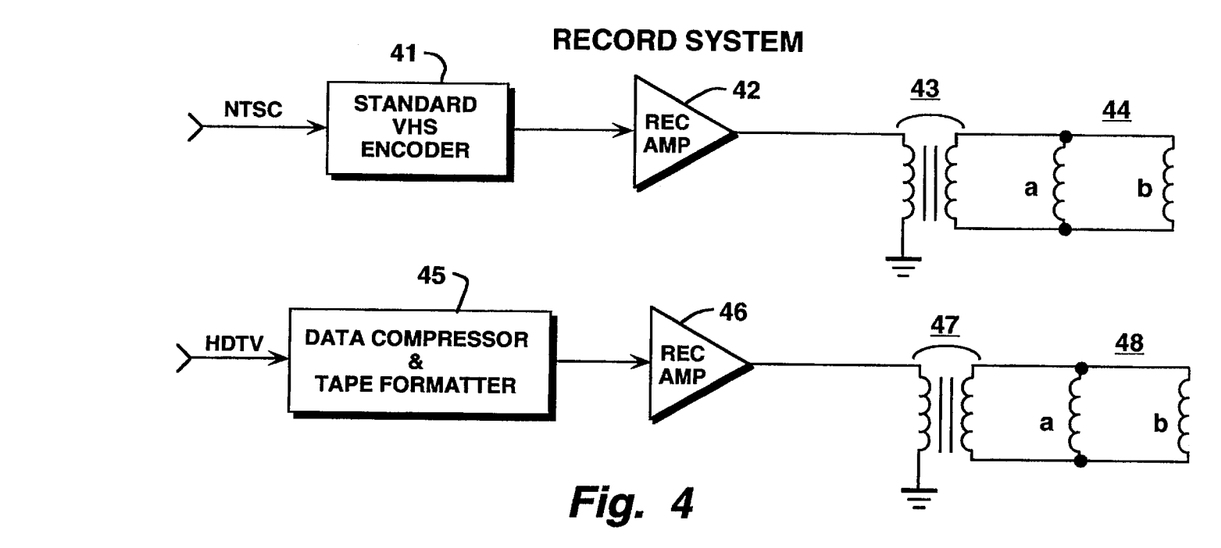
FIG. 4 illustrates a record apparatus in accordance with the present invention.

FIG. 4 illustrates a record apparatus in accordance with the present invention for recording tapes having a format shown in FIG. 2. Since VTR circuitry is so widely known, only a simple block diagram and brief description is deemed necessary.

A source, not shown, provides a standard NTSC color video signal, i.e., a 525 line interlaced TV signal having luminance and chrominance components, to a standard VHS encoder 41. As well known, encoder 41 processes the NTSC signal in accordance with the "color-under" technique, wherein an FM modulated luminance signal is combined with a lower frequency subcarrier having the chrominance information. The signals are added together at the output of encoder 41 and are then brought to the proper amplitude level via a record amplifier 42. A rotating transformer 43 applies these signals to magnetic recording heads 44a and 44b which are mounted on a rotating drum (not shown), which is positioned so that the tape is caused to be in moving contact therewith. The chrominance subcarrier is then recorded on the video tape using the FM modulated luminance signal as a bias.

Pick-up heads 44a and 44b are oriented on the drum (not shown) so as to create the standard VHS tracks having the well known alternating azimuth angles such as +6° and −6°, respectively, as shown in FIG. 2. These heads are 34 micrometers wide. However, as noted with respect to the recording technique of FIG. 3, these tracks are recorded after recordation of the auxiliary tracks, and is centered with respect to the recording of the auxiliary tracks.

The auxiliary track information applied to a data compressor and tape formatter processing block 45 is an analog signal descriptive of digital high definition television signal, which analog signal is spatially random with respect to the sequence of images it describes. Video compression encoding is formatter processing block 45. Video compression encoding is required due to bandwidth limitations in the auxiliary tracks. Several different types of digital video compression techniques are well known, such as the JPEG (Joint Photograph Experts Group) which uses discrete cosine transforms (DST) and MPEG (Moving Pictures Experts Group) which uses DST in conjunction with intra- and inter-frame compression algorithms. An article by Ang et al. in IEEE Spectrum, October 1991, Pages 16–19, entitled "Video Compression Makes Big Gains" can be referred to for more information about compression of HDTV signals.

Formatting of the digitized signal can be done using any of several well known formats which divide the data stream to be recorded in sub-units or blocks, including, e.g., synchronizing data, identification codes and image information. One such format usable herein is the well known D1 Standard proposed by SMPTE (Society of Motion Picture and Television Engineers).

Additionally, since in a high-density recording (such as the HDTV auxiliary track) the playback signal strength is relatively low, and furthermore, the playback can be degraded even further due to head mistracking and head-to-tape space variations, a NRZ recording format can also be used. The techniques and advantages of various types of NRZ recording formats are discussed in an article by Nakazawa et al. entitled "A Study on Detection Methods of NRZ Recording" published in IEEE Transactions on Magnetics, Vol. MAG-16, No. 1, January 1980, Pages 104–110.

The digitized, data compressed and formatted HDTV signal is then brought to a proper amplitude level for recording by a record amplifier 46, and a rotary transformer 47 applies the signal to recording heads 48a, 48b having opposite azimuth angles. In accordance with the recording technique of FIG. 3, heads 48a and 48b are each 58 micrometers wide and are mounted on the rotating drum (not shown) which has heads 44a and 44b, and are positioned so that their signal is recorded in the magnetic tape 20 first, and the signal from heads 44a and 44b are recorded thereafter in the middle portion of each earlier recorded track. This results in the formation of magnetic tape having the format shown in FIGS. 2 and 3. Alternatively, processing block 50 could divide the signal into two components and record each individually, but simultaneously, using an additional pair of auxiliary track heads, each pair of auxiliary track heads producing a 12 micrometer wide track, such as shown in FIG. 2. At the present time, however, this technique is not preferred by the inventors due to the complexity caused by having four recording heads for the auxiliary tracks.

Figure 5:
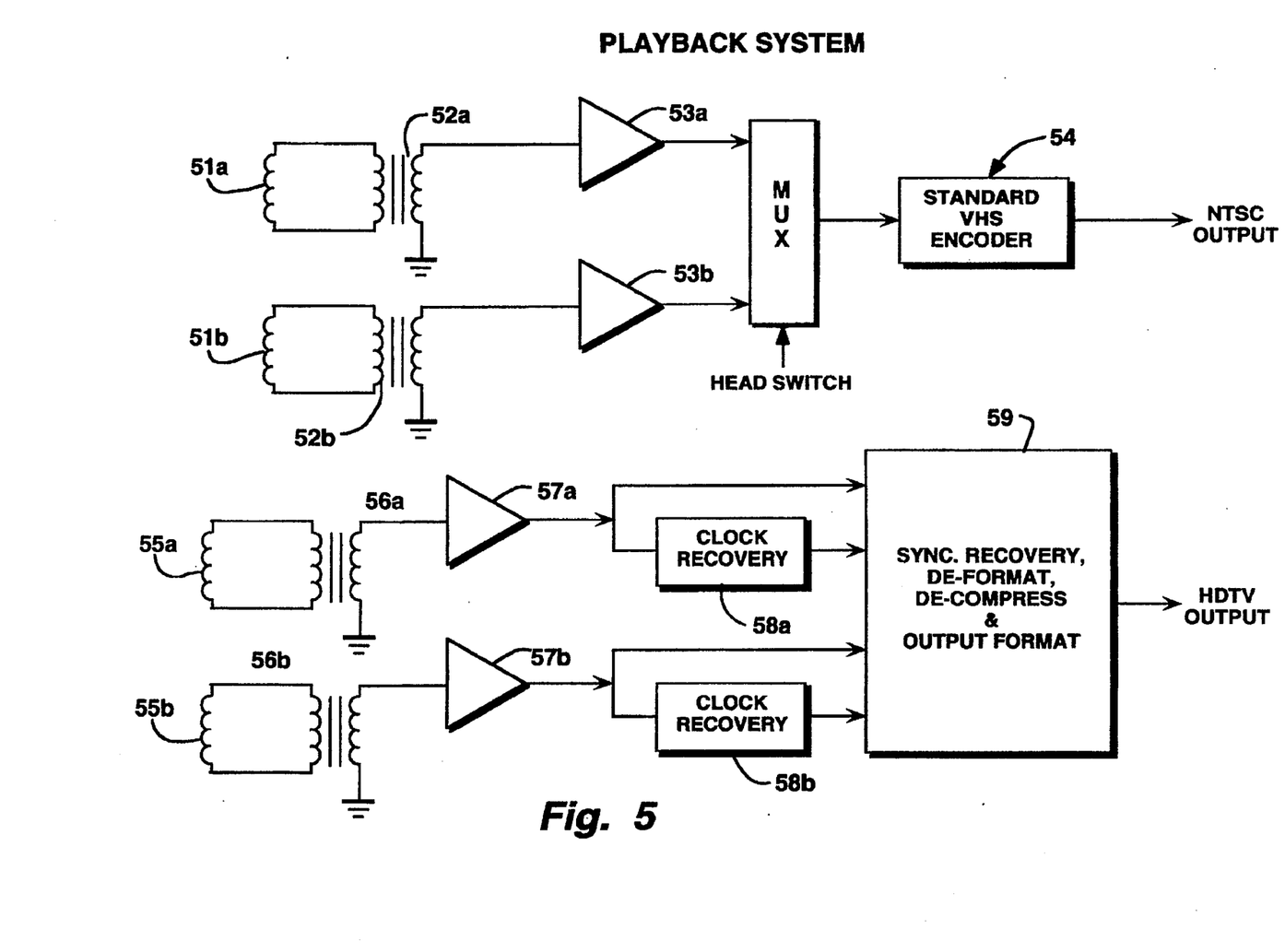
FIG. 5 illustrates a playback apparatus for playback of magnetic tapes having the format of FIG. 2.

FIG. 5 illustrates a playback apparatus for playback of magnetic tape having the format of FIG. 2, which is essentially the inverse of the record apparatus shown in FIG. 4. The standard VHS track information is converted to an electrical signal by magnetic pick-up heads 51a, 51b and applied via a rotary transformers 52a and 52b to playback amplifiers 53a and 53b which increase the amplitude level of the recovered signals. Amplifiers 53 not only increases the amplitude of the recovered signals, but also correct for amplitude roll-off and phase shift characteristics which are inherent in magnetic recording processes. A multiplexer combines the signals recovered from heads 51a and 51b into a single signal, using a headswitch signal, as well known. A standard VHS decoder 54 recovers and recombines the luminance and chrominance signals into a standard NTSC signal.

Pick-up heads 55a and 55b each convert the auxiliary track information recorded at their respective azimuth angle into electrical signal, and rotary transformers 56a and 56b apply these signals to playback amplifiers 57a and 57b. Amplifiers 57 not only increase the amplitude of the recovered signals, but also correct for amplitude roll-off and phase shift characteristics which are inherent in magnetic recording processes. Clock recovery circuits 58a and 58b are used to recover a clock signal from the recovered signal, and the clock signal from circuits 58 and the recovered data from amplifiers 57 are all applied to a sync recovery, deformat, decompress and output format processing block 59. Block 59 analyzes the recovered digitized auxiliary signal and reconstructs the HDTV signal therefrom in accordance with the inverse of the formatting and compressing techniques which were applied during the recording of the HDTV information, thereby generating the recovered HDTV signal at its output. As previously noted with respect to the optional use of two pairs of recording heads for recording the auxiliary tracks, the pick-up heads could also be arranged as two pairs of pick-up heads, each only 12 micrometers wide, but such an arrangement is not preferred at the present time due to its complexity.

Pleas note that in the present consumer market, the playback apparatus would only need to recover one of the recorded signal types, either VHS or HDTV. If, in the future, the recorded signals are such that they should be combined for forming the displayed images, the playback apparatus would have the full playback structure shown in FIG. 5.

Thus, there has been shown and described a novel magnetic recording/reproducing media format and apparatus in accordance therewith which fulfills all the objects and advantages sought therefore. Many changes, modifications, variations and other uses and applications of the subject invention will, however, become apparent to those skilled in the art after considering this specification and the accompanying drawings, which disclose a preferred embodiment thereof. For example, it may be desireable to record the standard VHS signals in the main tracks, and an augmentation signal in the auxiliary tracks, which augmentation signal can be combined with the VHS signal to provide a HDTV or wide aspect ratio signal. In this case, the playback apparatus would have the capability to recover both of the recorded signal types. All such changes, modifications, variations and other uses and applications of the invention are deemed to be covered by the claims which follow.

We claim:

1. A magnetic recording medium recording therewithin video signals of first and second types respectively for reproduction by a signal reproducer apparatus, each type of said video signals descriptive of both luminance and chrominance video signal components of the same sequence of images in accordance with a respective recording format, the descriptions of said same sequence of images by said video signals being essentially contemporaneous in nature, said magnetic recording medium comprising:

a plurality of regularly spaced, parallel slant tracks of a first type recorded with said video signals of said first type on the magnetic recording medium and being consecutively ordinally numbered in order of their occurrence in a prescribed direction along a surface of said magnetic recording medium, each said slant track of said first type having a predetermined spacing from each of closest neighboring others of said slant tracks of said first type, having a first track width, and having a respective prescribed azimuth angle, at least some of which prescribed azimuth angles have a first value;

a respective pair of slant tracks of a second type flanking opposite sides of each of said slant track of said first type, said pairs of slant tracks of said second type recorded with said video signals of said second type on the magnetic recording medium, both slant tracks of each said respective pair being recorded with a similar segment of said video signals of second type, the width of each said slant track of said second type of tracks being substantially one-half the predetermined spacing between the slant tracks of said first type, so that a respective two said slant tracks of said second type are positioned for filling each predetermined spacing between the slant tracks of said first type.

2. The magnetic medium of claim 1, wherein:

the azimuth angle of each, odd-numbered one of said slant tracks of said first type has said first value, and each even-numbered one of said slant tracks of said first type has a second value of substantially equal amplitude to, and of opposite polarity from said first value; and the azimuth angle of each said flanking pair of slant tracks of said second type is substantially equal in magnitude to, but opposite in sign from, the azimuth angle of a corresponding one of the slant tracks of said first type that is flanked on said opposite sides thereof by that said flanking pair of slant tracks of said second type.

3. The magnetic medium of claim 1, wherein:

the azimuth angle of each odd-numbered one of said slant tracks of said first type has said first value and each even-numbered one of said slant tracks of said first type has a second value of substantially equal amplitude to and of opposite polarity from said first value, and the azimuth angle of each pair of slant tracks of said second type flanking opposite sides of a corresponding one of said slant tracks of said first type is greater by a factor at least two than the azimuth angle of said corresponding one of said slant tracks of said first type.

4. Apparatus for recording signals descriptive of sequential images on a magnetic recording medium, comprising:

means for supplying a first information signal representing a video-descriptive portion of a standard VHS recording signal;

means for supplying a second information signal representing at least the video-descriptive portion of a high definition television signal, each of said first and said second information signals being descriptive of video content taken from the same said sequential images;

means for recording said first information signal on said magnetic recording medium within a plurality of parallel slant tracks of a first type having a predetermined spacing between adjacent ones of said slant tracks of said first type, each having a given trackwidth, and being consecutively ordinally numbered in order of their occurrence in a prescribed direction along a surface of said magnetic recording medium, the azimuth angle of each odd-numbered one of said slant tracks of said first type having a first value and the azimuth angle of each even-numbered one of said slant tracks of said first type having a second value of substantially equal amplitude to and of opposite polarity from said first value; and means for recording said second information signal on said magnetic recording medium within a plurality of pairs of slant tracks of a second type, said slant tracks of the second type in each of said pairs thereof flanking opposite sides of a respective one of said parallel slant tracks of said first type and both recording a similar segment of said second information signal, each of said slant tracks of said second type having a width substantially equal to one-half the predetermined spacing between successive ones of said first type of tracks so that two respective tracks of said second type are recorded within each said predetermined spacing so as to substantially fill said predetermined spacing.

5. Apparatus according to claim 4, wherein said means for recording a first information signal on said magnetic recording medium includes first magnetic recording head means for recording said first information signal on said magnetic recording medium; wherein said means for recording said second information signal on said magnetic recording medium includes second magnetic recording head means for recording said second information signal on said magnetic recording medium using a relatively wide trackwidth a trackwidth before said first magnetic recording head means records said first information signal thereon using said given trackwidth, resulting in relatively wide parallel slant tracks without spacing therebetween; and wherein said first magnetic recording head means thereafter records said first information signal with each of its resulting relatively narrow said slant tracks positioned substantially in the middle of one of said relatively wide slant tracks in an over-recording procedure resulting in one of said pairs of said tracks of said second type being separately recorded on respective sides of the over-recording one of said slant tracks of said first type.

6. Apparatus according to claim 4, wherein the azimuth angle of the slant tracks of said second type is greater than the azimuth angle of the slant tracks of said first type by a factor of at least two.

7. Apparatus according to claim 6, wherein said means for supplying a second information signal includes a digital data compressor and a tape formatter.

8. Apparatus according to claim 5, wherein said first magnetic recording head means includes a first narrowtrack head having a first azimuth angle associated therewith, said first narrowtrack head being included for recording certain ones of said slant tracks of said first type in said overrecording procedure; and wherein said second magnetic recording head means includes a first widetrack head having a second azimuth angle associated therewith different from said first azimuth angle, said first widetrack head being included for recording certain ones of said slant tracks of said second type, which after said overrecording procedure remain as said respective pairs of slant tracks of said second type which flank opposite sides of said slant tracks of said first type recorded by said first narrowtrack head.

9. Apparatus according to claim 8, wherein said second azimuth angle is greater than said first azimuth angle by a factor of at least two.

10. Apparatus according to claim 8, wherein said first magnetic recording head means includes a second narrowtrack head having a third azimuth angle associated therewith, said second narrowtrack head being included for recording certain ones of said tracks of said first type in said over-recording procedure, said third azimuth angle having a value substantially opposite to that of said first azimuth angle; and wherein said second magnetic recording head means includes a second widetrack head having a fourth azimuth angle associated therewith, said second widetrack head being included for recording tracks of said second type, portions of which said recording tracks of said second type after said over-recording procedure as said respective pairs of slant tracks of said second type which flank the opposite side of said parallel slant tracks of said first type over-recorded by said second narrowtrack head, said fourth azimuth angle having a value substantially opposite to that of said second azimuth angle.

11. Apparatus according to claim 10, wherein said second azimuth angle is greater than said first azimuth angle by a factor of at least two, and wherein said fourth azimuth angle is greater than said third azimuth angle by substantially the same factor.

12. Apparatus according to claim 10, wherein the azimuth angle of the tracks in each pair of tracks of said second type is the same in magnitude as the azimuth angle of said track of said first type the opposite sides of which track of said first type they respectively flank, but the azimuth angle of the tracks in each pair of tracks of said second type are opposite in sign from the azimuth angle of said track of said first type the opposite sides of which track of said first type they respectively flank.

13. Apparatus according to claim 8, wherein said first and second azimuth angles are the same in magnitude, but are opposite in sign.

14. Apparatus for recovering signals from a magnetic recording medium, comprising:

means for recovering a first information signal recorded on said magnetic recording medium as a plurality of regularly spaced parallel slant tracks of a first type, each having a given trackwidth and having an azimuth angle that is one of a number of given azimuth angles;

means for recovering a second information signal recorded on said magnetic recording medium as pairs of slant tracks of a second type each flanking opposite sides of a respective one of said slant tracks of said first type and providing duplicate recordings of a same portion of said second information signal, said second information signal being descriptive of digital samples of a sequence of images, each of said slant tracks of said second type having a width substantially equal to one-half the spacing between successive ones of said slant tracks of said first type so that two respective tracks of said second type are recorded substantially to fill each spacing between successive ones of said slant tracks of said first type, each pair of said slant tracks of said second type flanking opposite sides of a respective one of said slant tracks of said first type having the same azimuth angle as each other, which said same azimuth angle is one of a number of additional given azimuth angles; and means responsive to said second information signal for generating a video signal descriptive of said sequence of images.

15. Apparatus according to claim 14, wherein said first information signal is descriptive of said sequence of images; wherein said means for recovering said first information signal recorded on said magnetic recording medium includes a respective relatively narrow pickup head for each said given azimuth angle for regularly spaced parallel slant tracks of said first type, positioned so as to track ones of said regularly spaced parallel slant tracks of said first type recorded with that said given azimuth angle; and wherein said means for recovering said second information signal recorded on said magnetic recording medium includes a respective relatively wide pickup head for each said additional given azimuth angle positioned so as to track both of the tracks of said pairs of slant tracks of a second type recorded with that said additional given azimuth angle and separated by the one, of said slant tracks of said first type the opposite sides of which they respectively flank.

16. Apparatus as set forth in claim 14, wherein a first set of alternate ones of said regularly spaced parallel slant tracks of said first type are recorded with a first azimuth angle, and the pairs of said slant tracks of said second type flanking said first set of slant tracks of said first type on opposite sides thereof are recorded with a second azimuth angle of value substantially opposite to that of said first azimuth angle; and wherein a second set of alternate ones of said regularly spaced parallel slant tracks of said first type interleaved with said first set are recorded with a third azimuth angle, and the pairs of said slant tracks of said second type flanking said second set of slant tracks of said first type on opposite sides thereof are recorded with a fourth azimuth angle of value substantially opposite to that of said third azimuth angle.

17. Apparatus as set forth in claim 16, further comprising:
   a first, relatively narrow pickup head with said first azimuth angle included in said means for recovering a first information signal and arranged to track said first set of alternate ones of said regularly spaced parallel slant tracks of said first type, said first pickup head for generating electrical responses descriptive of first portions of said first information signal responsive to variations in the magnetism of said magnetic tape along said regularly spaced parallel slant tracks of said first type in said first set;
   a second, relatively wide pickup head with said second azimuth angle included in said means for recovering a second information signal and arranged to track each of said slant tracks of said second type in each of said pairs of said slant tracks of said second type flanking opposite sides of ones of said regularly spaced parallel slant tracks of said first type in said first set thereof, said second pickup head for generating electrical responses descriptive of first portions of said second information signal responsive to variations in the magnetism of said magnetic tape along pairs of tracks of said second type flanking opposite sides of said regularly spaced parallel slant tracks of said first type in said first set;
   a third, relatively narrow pickup head with said third azimuth angle included in said means for recovering a first information signal and arranged to track said second set of alternate ones of said regularly spaced parallel slant tracks of said first type, said third pickup head for generating electrical responses descriptive of second portions of said first information signal responsive to variations in the magnetism of said magnetic tape along said regularly spaced parallel slant tracks of said first type in said second set;
   a fourth, relatively wide pickup head with said fourth azimuth angle included in said means for recovering a second information signal and arranged to track each of said slant tracks of said second type in each of said pairs of said slant tracks of said second type flanking opposite sides of ones of said regularly spaced parallel slant tracks of said first type in said second set thereof, said fourth pickup head for generating electrical responses descriptive of second portions of said second information signal responsive to variations in the magnetism of said magnetic tape along pairs of tracks of said second type flanking opposite sides of said regularly-spaced parallel slant tracks of said first type in said second set;
   a first multiplexer of time-division type, included in said means for recovering a first information signal, and connected for recovering said first information signal responsive to said electrical responses descriptive of said first and second portions of said first information signal as generated by said first and third pickup heads; and
   a second multiplexer of time-division type, included in said means for recovering a second information signal, and connected for recovering said second information signal responsive to said electrical responses descriptive of said first and second portions of said second information signal as generated by said second and fourth pickup heads.

18. Apparatus as set forth in claim 17, wherein said first and second azimuth angles are opposite in value, wherein said second azimuth angle is greater than said first azimuth angle by a factor of at least two, and wherein said fourth azimuth angle is greater than said third azimuth angle by substantially the same factor.

19. Apparatus as set forth in claim 17, wherein said first and second azimuth angles are the same in magnitude, but are opposite in sign; and wherein said third and fourth azimuth angles are the same in magnitude, but are opposite in sign.

20. Apparatus for recovering signals from a magnetic recording medium, comprising:
   means for recovering an information signal recorded on said magnetic recording medium, said information signal being descriptive of digital samples of a sequence of images, said digital samples being arranged together with synchronizing data and identification codes in blocks within said information signal, said information signal being recorded in duplicate in pairs of slant tracks of a second type, the tracks of each of which said pairs of said second type of slant tracks have a same portion of said information signal respectively recorded therewithin and flank a respective one of a plurality of regularly spaced further tracks of a first type on opposite sides thereof also recorded on said magnetic recording medium, said slant tracks of said second type having a width substantially equal to one-half the spacing between successive ones of said tracks of said first type so that two respective tracks of said second type are recorded within each such spacing so as substantially fill said spacing between successive ones of said tracks of said first type; and
   means responsive to said information signal recovered from the slant tracks of said second type, for generating a video signal descriptive of said sequence of images.

21. A magnetic tape on which a VHS signal descriptive of a sequence of images and another signal descriptive of the video content of said sequence of images are recorded in accordance with a modified recording format that is backward compatible with the conventional VHS recording format, for reproduction by a signal reproducer apparatus capable of reproducing at least one of said VHS signal and said another signal said modified recording format comprising:
   a plurality of regularly spaced, parallel slant tracks of a first type recording a video portion of said VHS signal and diagonally crossing said magnetic tape at a predetermined angle similar to that in said conventional VHS recording format, each track of said first type having a spacing from closest neighboring others of said tracks of said first type similar to that in said conventional VHS recording format, having a first track width similar to that in said conventional VHS recording format, and having an azimuth angle similar to that in said conventional VHS recording format; and
   a respective pair of slant tracks of a second type flanking opposite sides of each said slant tracks of said first type on the magnetic tape and recording said other signal descriptive of the video content of the same sequence of images as said VHS signal, the azimuth angle of each said pair of slant tracks of a second type being different from the azimuth angle of the track of said first type they respectively flank, the width of each track of said second type of tracks being substantially one-half the spacing between the tracks of said first type, so that two respective tracks of second type are positioned in, and substantially fill each spacing.

22. A magnetic tape as set forth in claim 21, wherein the azimuth angle of successive ones of said first type of tracks alternate between two oppositely directed angles, and the azimuth angle of each pair of tracks of said second type is greater by a factor at least two than the azimuth angle of the track of said first type they respectively flank.

23. A magnetic tape as set forth in claim 21, wherein:

the azimuth angle of successive ones of said first type of tracks alternate between two oppositely directed angles, and the azimuth angle of each pair of tracks of said second type is the same in magnitude as the azimuth angle of the track of said first type they respectively flank, but opposite in sign to the azimuth angle of the track of said first type they respectively flank.

24. A method for recording signals on a magnetic tape helically scanned during recording by a headwheel assembly including a first widetrack head followed in the forward direction of tape transportation by a first narrowtrack head on a first side of said headwheel assembly and including a second widetrack head followed in the forward direction of tape transportation by a second narrowtrack head on another side of said headwheel assembly rotated from said first side, said method comprising the steps of:

applying a non-VHS recording signal to said first and second widetrack heads to create a contiguous set of uniform-width, relatively wide width parallel recording tracks diagonally crossing said magnetic tape, said non-VHS recording signal being descriptive of the video content of sequential images; and applying a VHS recording signal to said first and second narrowtrack heads for recording a respective uniform-width, relatively narrow width recording track over the central portion of each said relatively wide width parallel recording tracks, thereby to leave a pair of tracks recording said non-VHS recording signal respectively flanking opposite sides of each relatively narrow width recording track recording said VHS recording signal, said VHS recording signal being descriptive of the video content of said sequential images.

25. A magnetic tape recorded in accordance with the method of claim 24.

26. Apparatus for performing the method of claim 24.

27. An improved magnetic recording medium recording therewithin signals of first and second types in accordance with a recording format, for reproduction by a signal reproducer apparatus capable of reproducing signals of at least said first and second types, said recording format comprising:

a plurality of regularly spaced, parallel slant tracks of a first-type recorded with said signal of first type on the magnetic recording medium, each said slant track of said first type having a predetermined spacing from each of closest neighboring others of said slant tracks of said first type, having a first track width, and having a respective prescribed azimuth angle, at least some of which prescribed azimuth angles have a first value;

a respective pair of slant tracks of a second type flanking opposite sides of each said slant track of said first type and being recorded with said signal of second type on the magnetic recording medium, both slant tracks of each said respective pair being recorded with a similar segment of said signal of second type, the width of each said slant track of said second type of tracks being substantially one-half the predetermined spacing between the slant tracks of said first type, so that a respective two said slant tracks of said second type are positioned for filling each predetermined spacing; and the improvement wherein said signal of second type is descriptive of digital samples of at least video portions of a sequence of images, said digital samples being arranged, together with synchronizing data and identification codes, in blocks within said signal of second type.

28. An improved magnetic recording medium recording therewithin signals of first and second types in accordance with a recording format, for reproduction by signal reproducer apparatus capable of reproducing signals of at least one of said first and second types, said recording format comprising:

a plurality of regularly spaced, parallel slant tracks of a first type recorded with said signal of first type on the magnetic recording medium, each said slant track of said first type having a predetermined spacing from each of closet neighboring others of said slant tracks of said first type, having a first track width, and having a respective prescribed azimuth angle, at least some of which prescribed azimuth angles have a first value;

a respective pair of slant tracks and being recorded with said signal of second type on the magnetic recording medium, both slant tracks of each said respective pair being recorded with a similar segment of said signal of second type, the width of each said slant track of said second type of tracks being substantially one-half the predetermined spacing between the slant tracks of said first type, so that a respective two said slant tracks of said second type are positioned for filling each predetermined spacing; and said signal of first type being a VHS recording signal descriptive of a sequence of images, and said signal of second type being descriptive of digital samples of at least video portions of said sequence of images, said digital samples being arranged, together with synchronizing data and identification codes, in blocks within said signal of second type.

29. Apparatus for recording signals descriptive of sequential images on a magnetic recording medium, comprising:

means for supplying a first information signal; and means for supplying a second information signal, said second information signal being descriptive of digital samples of a sequence of images, said digital samples being arranged, together with synchronizing data and identification codes, in blocks within said signal of second type;

means for recording said first information signal on said magnetic recording medium within a plurality of parallel slant tracks of a first type having a predetermined spacing between adjacent ones of said parallel slant tracks of said first type, having a given trackwidth, and being consecutively ordinally numbered in order of their occurrence in a prescribed direction along a surface of said magnetic recording medium, the azimuth angle of each odd-numbered one of said slant tracks of said first type having a first value and the azimuth angle of each even-numbered one of said slant tracks of said first type having a second value of substantially equal amplitude to and of opposite polarity from said first value; and means for recording said second information signal on said magnetic recording medium within a plurality of pairs of slant tracks of a second type, said slant tracks of the second type in each of said pairs thereof flanking opposite sides of a respective one of said parallel slant tracks of said first type and both recording a similar segment of said second information signal, each of said slant tracks of said second type having a width substantially equal to-one-half the spacing between successive ones of said first type of tracks so that two respective tracks of said second type are recorded within each said predetermined spacing so as substantially fill said predetermined spacing.

* * * * *

UNITED STATES PATENT AND TRADEMARK OFFICE
CERTIFICATE OF CORRECTION

PATENT NO.   : 5,623,573
DATED        : Apr. 22, 1997
INVENTOR(S)  : Strolle et al.

It is certified that error appears in the above-indentified patent and that said Letters Patent is hereby corrected as shown below:

Claim 17,   Line 59,   between "regularly" and "spaced" delete "- " (hyphen); and Claim 21,   Line 51,   after "signal", insert --,-- (comma):

Signed and Sealed this

Eighth Day of July, 1997

Attest:

*Attesting Officer*

BRUCE LEHMAN
*Commissioner of Patents and Trademarks*